United States Patent
Umezawa et al.

(10) Patent No.: US 12,080,189 B2
(45) Date of Patent: Sep. 3, 2024

(54) AUDIO ADVERTISEMENT DELIVERY SYSTEM, PROGRAM AND USER TERMINAL BASED ON TWO OR MORE ADVERTISEMENT LOCATIONS AND THE USER DIRECTION

(71) Applicants: JTEKT CORPORATION, Osaka (JP); CONNECTOME.DESIGN CO., LTD., Tokyo (JP)

(72) Inventors: Hiroki Umezawa, Osaka (JP); Akira Sato, Tokyo (JP)

(73) Assignee: CONNECTOME.DESIGN CO., LTD., Tokyo (JP)

( * ) Notice: Subject to any disclaimer, the term of this patent is extended or adjusted under 35 U.S.C. 154(b) by 0 days.

(21) Appl. No.: 18/250,595

(22) PCT Filed: Oct. 26, 2020

(86) PCT No.: PCT/JP2020/040078
§ 371 (c)(1),
(2) Date: Apr. 26, 2023

(87) PCT Pub. No.: WO2022/091177
PCT Pub. Date: May 5, 2022

(65) Prior Publication Data
US 2024/0038106 A1    Feb. 1, 2024

(51) Int. Cl.
*G09F 25/00*    (2006.01)
*G06F 16/438*   (2019.01)
(Continued)

(52) U.S. Cl.
CPC .............. *G09F 25/00* (2013.01); *G10L 25/81* (2013.01); *G06F 16/4387* (2019.01); *H04M 3/56* (2013.01)

(58) Field of Classification Search
CPC .............................. H04M 3/56; G06F 16/4387
(Continued)

(56) References Cited

U.S. PATENT DOCUMENTS

2007/0071204 A1* 3/2007 Kanada .................. H04M 3/56
                                                                 379/158
2020/0286128 A1* 9/2020 Albl ..................... G06F 16/4387

FOREIGN PATENT DOCUMENTS

JP    10-055150 A    2/1998
JP    2005-311974 A  11/2005
(Continued)

OTHER PUBLICATIONS

International Search Report from PCT/JP2020/040078 Jan. 12, 2021, 3 pgs.

*Primary Examiner* — Farzad Kazeminezhad
(74) *Attorney, Agent, or Firm* — Tutunjian & Bitetto, P.C.

(57) ABSTRACT

The voice advertisement delivery system includes a user terminal, an advertiser terminal, and a voice advertisement delivery server. The voice advertisement delivery server receives designation of a preferred location to which voice advertisement is delivered from the advertiser terminal and acquires user location information indicating the location of a user and user direction information indicating the direction of the user. The user location information is transmitted to the voice advertisement delivery server. The advertisement location information and voice advertisement data are delivered to the user terminal when the user location information approaches the designated advertisement location information and satisfies a predetermined condition. The user terminal operates spatial sound and reproduces the voice advertisement.

21 Claims, 8 Drawing Sheets

(51) Int. Cl.
*G10L 25/81* (2013.01)
*H04M 3/56* (2006.01)

(58) Field of Classification Search
USPC .......................................................... 379/158
See application file for complete search history.

(56) References Cited

FOREIGN PATENT DOCUMENTS

| | | | |
|---|---|---|---|
| JP | 2008-046987 A | | 2/2008 |
| JP | 2010032851 A | * | 2/2010 |
| JP | 2010-146188 A | | 7/2010 |
| JP | 2013-005021 A | | 1/2013 |
| JP | 2016-021169 A | | 2/2016 |
| JP | 2017-058317 A | | 3/2017 |
| WO | 2018/066191 A1 | | 4/2018 |
| WO | 2018/211748 A1 | | 11/2018 |

* cited by examiner

AUDIO ADVERTISEMENT DELIVERY SYSTEM, PROGRAM AND USER TERMINAL BASED ON TWO OR MORE ADVERTISEMENT LOCATIONS AND THE USER DIRECTION

CROSS-REFERENCE TO RELATED APPLICATIONS

This application is the US national stage of International Patent Application No. PCT/JP2020/040078 filed on Oct. 26, 2020, the disclosure of which is incorporated herein by reference in its entirety.

TECHNICAL FIELD

The present disclosure relates to a system, a method, a program, and a user terminal for voice advertisement delivery. Specifically, the present disclosure relates to a system, a method, a program, and a user terminal for voice advertisement delivery on spatial sound.

BACKGROUND

Recently, technology to deliver voice advertisement has been drawn attention. For example, a technology that delivers a voice advertisement suitable for a user based on user behavior for a web page is proposed (Patent Document 1). Furthermore, a technology that outputs voice advertisement concerning visual advertisement recognized by eyesight where a user came in contact in the past if a predetermined object is at a predetermined location from the location of voice advertisement is proposed (Patent Document 2).

DOCUMENT IN THE EXISTING ART

Patent Document

Patent Document 1: JP 2010-146188 A
Patent Document 2: JP 2017-058317 A

SUMMARY

The Technical Problem Solved by the Disclosure

For delivery of voice advertisement, it is important to tell the user the location of voice advertisement as well as the content of advertisement, especially, when voice advertisement is set around user's actual location. However, the technologies of Patent Documents 1 and 2 are unable to audibly deliver spatial sound of voice advertisement to a user terminal from the direction of the location where voice advertisement is set.

An objective of the present disclosure is to acquire the user location of a user terminal used by a user and audibly deliver spatial sound of voice advertisement to a user terminal from the direction of the location where voice advertisement is set when the user location approaches a designated advertisement location in a situation that satisfies a predetermined condition.

Solution for Solving the Technical Problem

The present disclosure provides a system for voice advertisement delivery that audibly delivers spatial sound of voice advertisement to a user terminal used by a user from the direction of the location where voice advertisement is set, including: a designation unit that designates advertisement location information indicating a location to set the voice advertisement; a user location acquisition unit that acquires user location information indicating the location of a user; a user direction acquisition unit that acquires the user direction information indicating the direction of the user's face; a delivery unit that delivers the advertisement location information and voice advertisement data to the user terminal when the acquired user location information approaches the designated advertisement location information in a situation that satisfies a predetermined condition; a spatial sound operation unit that calculates the relative direction of the user to an advertisement location based on the user location information, the user direction information, and the advertisement location information and operates spatial sound for the user to hear from the direction of the advertisement location; and a voice content detection unit that detects a voice content that the user is listening to with the user terminal, wherein the delivery unit delivers the voice advertisement data according to the detected voice content, and when the detected voice content is music, the delivery unit changes a part of the lyrics of the music into advertisement and deliver the voice advertisement.

The present disclosure also provides a system for voice advertisement delivery that audibly delivers spatial sound of voice advertisement to a user terminal used by a user from the direction of the location where voice advertisement is set, comprising: a designation unit that designates advertisement location information indicating a location to set the voice advertisement; a user location acquisition unit that acquires user location information indicating the location of a user; a user direction acquisition unit that acquires the user direction information indicating the direction of the user's face; a delivery unit that delivers the advertisement location information and voice advertisement data to the user terminal when the acquired user location information approaches the designated advertisement location information in a situation that satisfies a predetermined condition; a spatial sound operation unit that operates the relative direction of the user to an advertisement location based on the user location information, the user direction information, and the advertisement location information and operates spatial sound for the user to hear from the direction of the advertisement location; a voice content detection unit that detects a voice content that the user is listening to with the user terminal; and a voice content change unit that changes the detected voice content wherein the delivery unit delivers the voice advertisement data according to the detected voice content, and the spatial sound operation unit changes the direction of the spatial sound of the detected voice content and informs the user the direction of preferred voice advertisement.

The present disclosure also provides a system for voice advertisement delivery that audibly delivers spatial sound of voice advertisement to a user terminal used by a user from the direction of the location where voice advertisement is set, comprising: a designation unit that designates advertisement location information indicating a location to set the voice advertisement; a user location acquisition unit that acquires user location information indicating the location of a user; a user direction acquisition unit that acquires the user direction information indicating the direction of the user's face; a delivery unit that delivers the advertisement location information and voice advertisement data to the user terminal when the acquired user location information approaches the designated advertisement location information in a situation that satisfies a predetermined condition; a spatial sound operation unit that operates the relative direction of the user to an advertisement location based on the user location information, the user direction information, and the advertisement location information and operates spatial sound for the user to hear from the direction of the advertisement location; a voice content detection unit that detects a voice content that the user is listening to with the user terminal; and a voice content change unit that changes the detected voice content wherein the delivery unit delivers the voice advertisement data according to the detected voice content, and the spatial sound operation unit changes the direction of the spatial sound of the detected voice content and informs the user the direction of preferred voice advertisement.

The present disclosure provides a method for voice advertisement delivery that audibly delivers spatial sound of voice advertisement to a user terminal used by a user from the direction of the location where voice advertisement is set, including the steps of: designating advertisement location information indicating a location to set the voice advertisement; acquiring user location information indicating the location of a user; acquiring the user direction information indicating the direction of the user's face; delivering the advertisement location information and voice advertisement data to the user terminal when the acquired user location information approaches the designated advertisement location information in a situation that satisfies a predetermined condition; calculating the relative direction of the user to an advertisement location based on the user location information, the user direction information, and the advertisement location information and operating spatial sound for the user to hear from the direction of the advertisement location; and detecting a voice content that the user is listening to with the user terminal, wherein the delivering step delivers the voice advertisement data according to the detected voice content, and when the detected voice content is music, the delivering step changes a part of the lyrics of the music into advertisement and deliver the voice advertisement.

The present disclosure also provides a method for voice advertisement delivery that audibly delivers spatial sound of voice advertisement to a user terminal used by a user from the direction of the location where voice advertisement is set, comprising the steps of: designating advertisement location information indicating a location to set the voice advertisement; acquiring user location information indicating the location of a user; acquiring the user direction information indicating the direction of the user's face; delivering the advertisement location information and voice advertisement data to the user terminal when the acquired user location information approaches the designated advertisement location information in a situation that satisfies a predetermined condition; operating the relative direction of the user to an advertisement location based on the user location information, the user direction information, and the advertisement location information and operating spatial sound for the user to hear from the direction of the advertisement location; detecting a voice content that the user is listening to with the user terminal; and changing the detected voice content, wherein the delivering step delivers the voice advertisement data according to the detected voice content, and the operating step changes the direction of the spatial sound of the detected voice content and informs the user the direction of preferred voice advertisement.

The present disclosure provides a computer-readable program to cause a computer to execute a process for voice advertisement delivery that audibly delivers spatial sound of voice advertisement to a user terminal used by a user from the direction of the location where voice advertisement is set, the process including the steps of: designating advertisement location information indicating a location to set the voice advertisement; acquiring user location information indicating the location of a user; acquiring the user direction information indicating the direction of the user's face; delivering the advertisement location information and voice advertisement data to the user terminal when the acquired user location information approaches the designated advertisement location information in a situation that satisfies a predetermined condition; calculating the relative direction of the user to an advertisement location based on the user location information, the user direction information, and the advertisement location information and operating spatial sound for the user to hear from the direction of the advertisement location; detecting a voice content that the user is listening to with the user terminal, wherein the delivering step delivers the voice advertisement data according to the detected voice content, and when the detected voice content is music, the delivering step changes a part of the lyrics of the music into advertisement and deliver the voice advertisement.

The present disclosure provides a computer-readable program to cause a computer to execute a process for voice advertisement delivery that audibly delivers spatial sound of voice advertisement to a user terminal used by a user from the direction of the location where voice advertisement is set, the process comprising the steps of: designating advertisement location information indicating a location to set the voice advertisement; acquiring user location information indicating the location of a user; acquiring the user direction information indicating the direction of the user's face; delivering the advertisement location information and voice advertisement data to the user terminal when the acquired user location information approaches the designated advertisement location information in a situation that satisfies a predetermined condition; operating the relative direction of the user to an advertisement location based on the user location information, the user direction information, and the advertisement location information and operating spatial sound for the user to hear from the direction of the advertisement location; detecting a voice content that the user is listening to with the user terminal; and changing the detected voice content, wherein the delivering step delivers the voice advertisement data according to the detected voice content, and the operating step changes the direction of the spatial sound of the detected voice content and informs the user the direction of preferred voice advertisement.

Moreover, the present disclosure provides a user terminal used for the system for voice advertisement delivery, including a reproduction unit that reproduces the operated spatial sound of the voice advertisement.

Technical Effect

The present disclosure designates advertisement location information indicating a location to set the voice advertisement; acquires user location information indicating the location of a user; acquires the user direction information indicating the direction of the user's face; delivers the advertisement location information and voice advertisement data to the user terminal when the acquired user location information approaches the designated advertisement location information in a situation that satisfies a predetermined condition; and calculates the relative direction of the user to an advertisement location based on the user location information, the user direction information, and the advertisement location information and operates spatial sound for the user to hear from the direction of the advertisement location.

Accordingly, the user terminal used by a user is able to audibly reproduce the spatial sound of the voice advertisement to a user terminal used by a user from the direction of the location where voice advertisement is set.

DETAILED DESCRIPTION OF THE EMBODIMENTS

The present disclosure acquires user location information of a user terminal used by a user; acquires the user direction information indicating the direction of the user's face; delivers the advertisement location information and voice advertisement data to the user terminal when the acquired user location information approaches the designated advertisement location information in a situation that satisfies a predetermined condition; and calculates the relative direction of the user to an advertisement location based on the user location information, the user direction information, and the advertisement location information and operates spatial sound for the user to hear from the direction of the advertisement location. Examples of the user terminal include a smart phone, an earphone, a bone-conduction earphone, an audio necklace, audio glasses, and mobility audio for a car or a motorcycle but limited thereto. The best mode of carrying out the present disclosure is specifically described below based on Examples.

Overall Configuration

Figure 1:
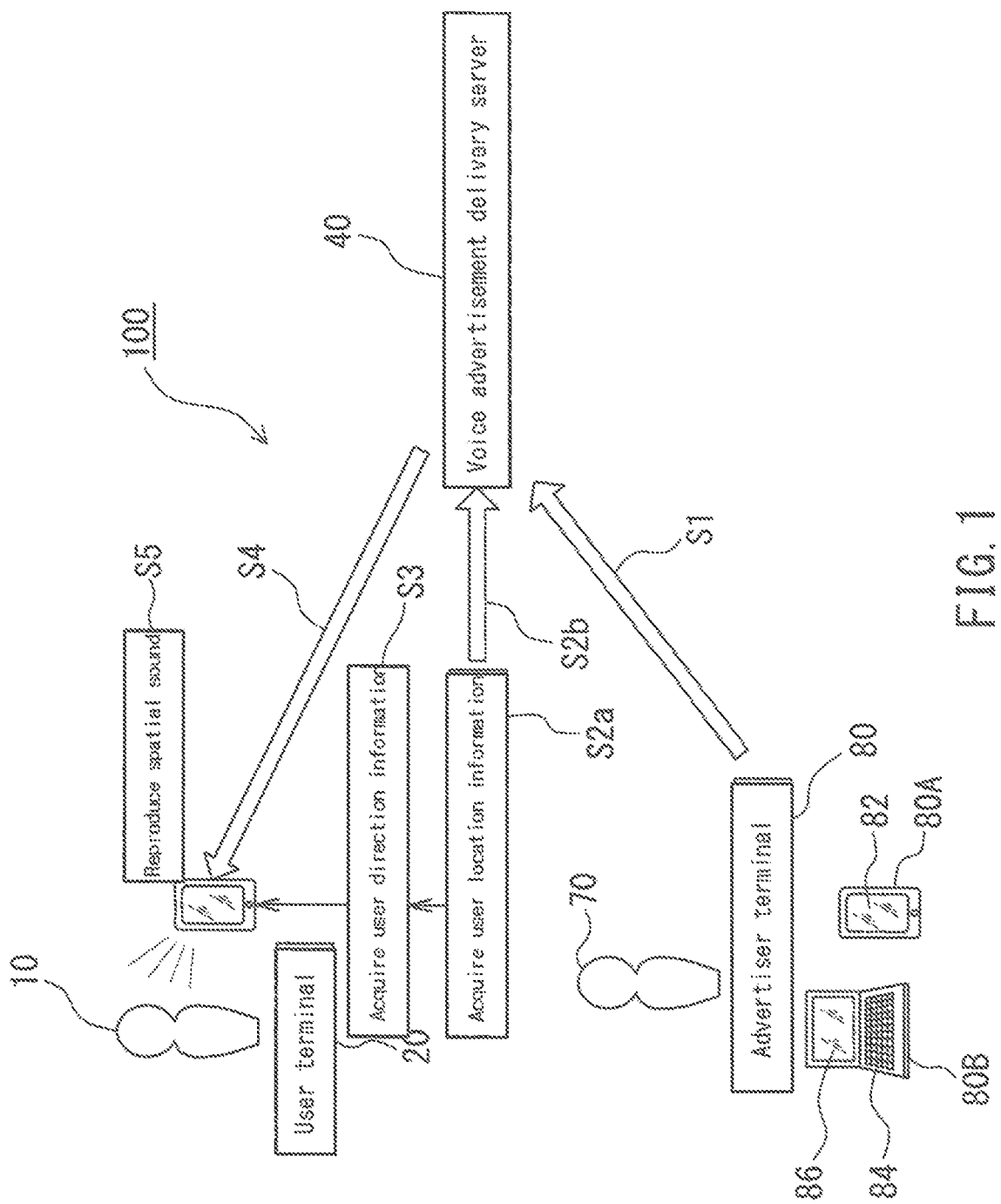
FIG. 1 is a schematic diagram that illustrates the overall configuration of the system for voice advertisement delivery of one embodiment of the present disclosure.

FIG. 1 is a schematic diagram that illustrates the overall configuration of the system for voice advertisement delivery of the embodiment. As shown in FIG. 1, the system for voice advertisement delivery 100 includes a user terminal 20 of a user 10, an advertiser terminal 80 of an advertiser 70, and a voice advertisement delivery server 40. These components are mutually data-communicative through a network such as the Internet not shown in the attached drawings.

As shown in FIG. 1, the voice advertisement delivery server 40 receives designation of a preferred location to which voice advertisement is delivered from the advertiser terminal 80 of an advertiser 70 (Step S1). Specifically, an advertisement location indicating a location to set the voice advertisement is designated on a map, etc. For example, if the advertiser terminal 80A is a smart phone, an advertiser 70 designates a location on a map displayed on a touch panel 82. If the advertiser terminal 80B is a note PC, an advertiser 70 designates a location on a map displayed on the display 86 by using an input means such as a keyboard 84 or a mouse.

The user terminal 20 acquires user location information indicating the location of a user 10 (Step S2a). Specifically, the location information is acquired from the GPS, the beacon, etc., of the user terminal 20 or other terminals. The acquired user location information is transmitted to the voice advertisement delivery server 40 (Step S2b).

The user terminal 20 acquires user direction information indicating the direction of the user 10 (Step S3). Specifically, the direction information is acquired from the electronic compass, etc., of the user terminal 20 or other terminals. The user direction is preferably the direction of the user's face. If the user terminal 20 is an earphone, etc., which means that the user direction approximately corresponds to the direction of the terminal, the direction of the terminal may be used as user direction information.

The voice advertisement delivery server 40 delivers the advertisement location and voice advertisement data to the user terminal 20 when the acquired user location information approaches the designated advertisement location information in a situation that satisfies a predetermined condition (Step S4). For example, the predetermined condition is within a radius of 100 m around the designated advertisement location. The user terminal 20 may be a smart phone or other terminals (e.g., a smart earphone, a bone-conduction earphone, an audio necklace, audio glasses, mobility audio for a car or a motorcycle).

The user terminal 20 calculates the relative direction of the user to an advertisement location based on the user location information, the user direction information, and the advertisement location information, operates spatial sound for the user to hear from the direction of the advertisement location, and reproduces the spatial sound of the voice advertisement (Step S5). The user terminal 20 that acquires the user direction information may be a smart phone or other terminals (e.g., a smart earphone, a bone-conduction earphone, an audio necklace, audio glasses, mobility audio for a car or a motorcycle).

Configuration of User Terminal

Figure 2:
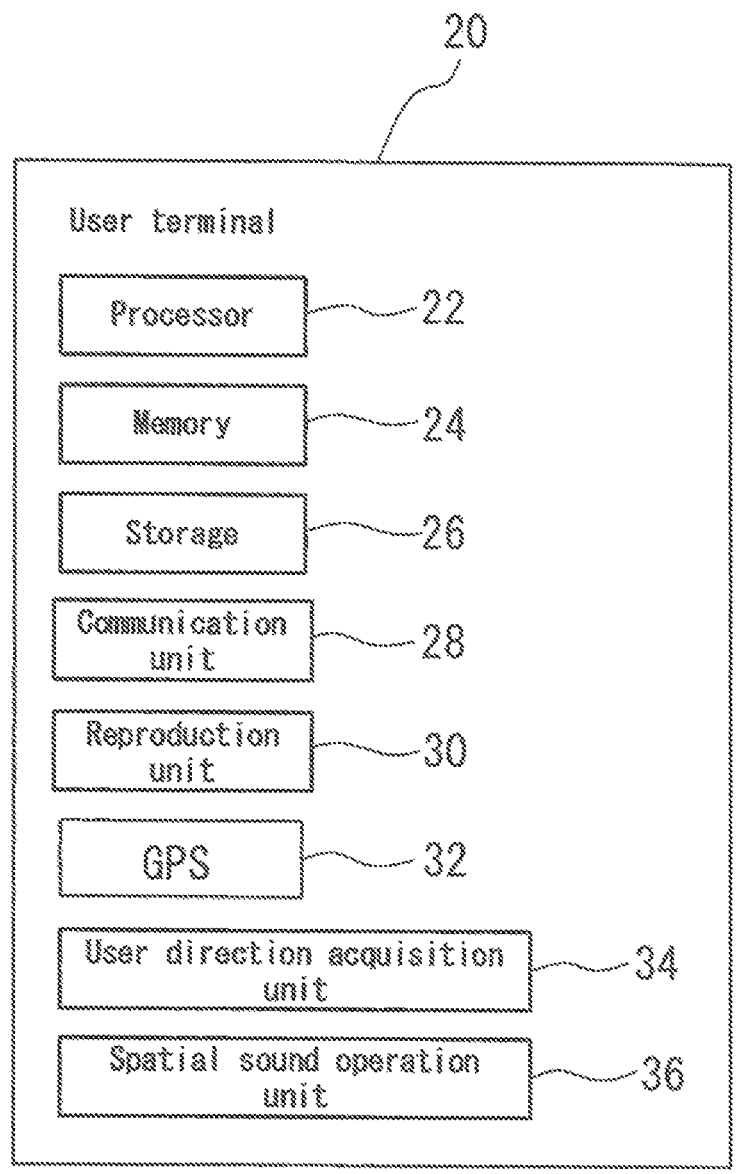
FIG. 2 is a block diagram that illustrates the configuration of the user terminal of the embodiment.

FIG. 2 is a block diagram that illustrates the configuration of the user terminal 20 of the embodiment. For example, the user terminal 20 is provided with a processor 22, a memory 24, a storage 26, a communication unit 28, a reproduction unit 30, a GPS 32, a user direction acquisition unit 34, and a spatial sound operation unit 36. These components are connected through a bus not shown in the attached drawings. For example, the processor 22 is composed of CPU (Central Processing Unit), which performs various processes by reading and executing various programs stored in the memory 24.

The memory 24 stores programs executed by the processor 22, which is, for example, composed of ROM (Read Only Memory) and RAM (Random Access Memory). The storage 26 stores the acquired user location information and user direction information and control programs, etc., not shown in the attached drawings. The communication unit 28 performs various data communications with the advertiser terminal 80, 80A, 80B and the voice advertisement delivery server 40 through a network. Obviously, the communication unit 28 performs various data communications with other external units if necessary.

The reproduction unit 30 is, for example, a speaker that reproduces and outputs the operated spatial sound of the voice advertisement delivered from the voice advertisement delivery server 40 to the communication unit 28. GPS 32 acquires the location information of the user terminal 20. The acquired location information may be stored in the storage 26 as the user location information 26A (refer to FIG. 7). The user direction acquisition unit 34 acquires the direction information of the user terminal 20. As the user direction acquisition unit 34, an electronic compass is used, for example, but it is not limited thereto. The acquired user direction information 26B (refer to FIG. 7) may be stored in the storage 26.

The spatial sound operation unit 36 calculates the relative direction of the user to the advertisement location based on the acquired user location information, user direction information, and advertisement location information and operates spatial sound for the user to hear from the direction of the advertisement location.

Moreover, the spatial sound operation unit 36 may operate spatial sound for the user to hear from the direction of the advertisement location to the user terminal 20 whenever the acquired user location information changes. For example, the spatial sound operation unit 36 operates spatial sound to audibly deliver the voice advertisement from the front direction when the user location information approaches the advertisement location and then audibly deliver the voice advertisement from the left direction when the user location information turns right.

In addition, the spatial sound operation unit 36 may change the direction of the spatial sound of the detected voice content and change the direction of preferred voice advertisement.

As the user terminal 20, a smart phone may be used, but it is not limited thereto. Other terminals such as a smart earphone, a bone-conduction earphone, an audio necklace, audio glasses, and mobility audio for a car or a motorcycle may be used. Moreover, various types of user terminal 20 may be used depending on users 10.

Hardware Configuration of Voice Advertisement Delivery Server

Figure 3:
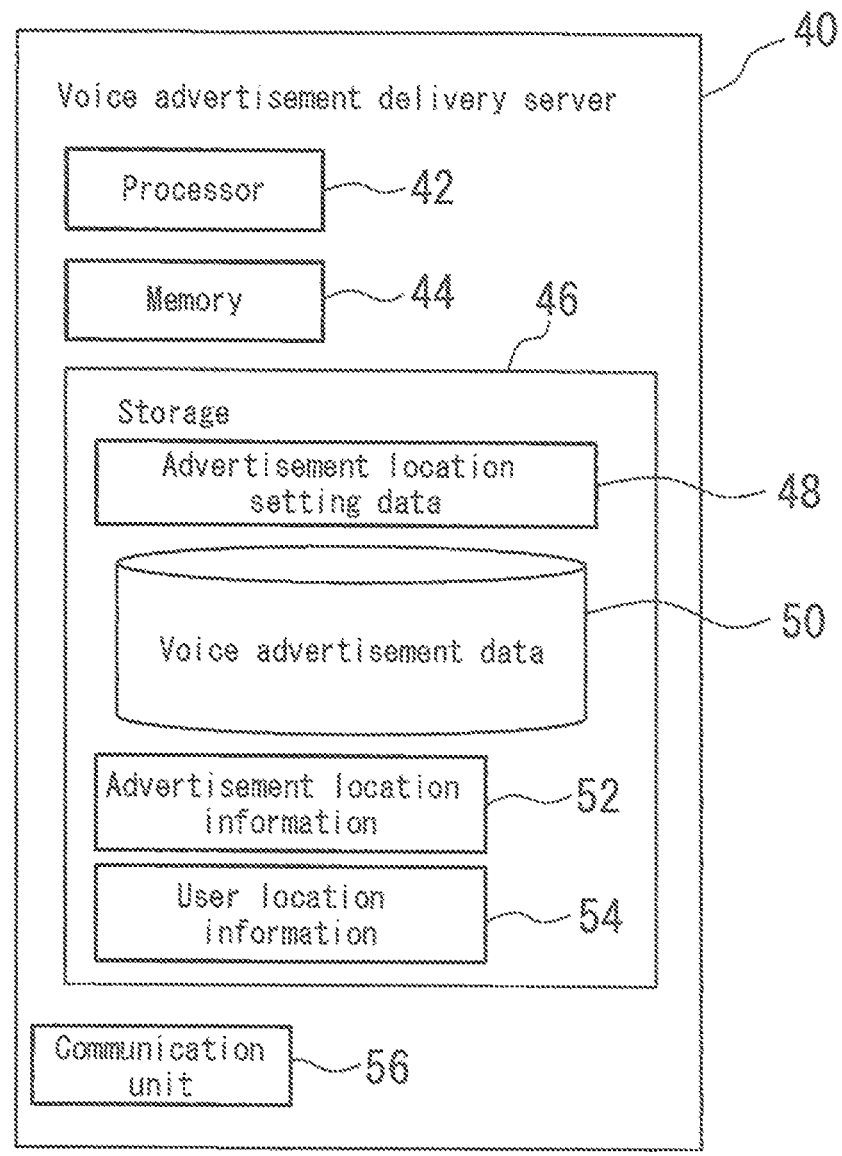
FIG. 3 is a block diagram that illustrates the hardware configuration of the voice advertisement delivery server of the embodiment.

FIG. 3 is a block diagram that illustrates the hardware configuration of the voice advertisement delivery server 40 of the embodiment. The voice advertisement delivery server 40 is provided with a processor 42, a memory 44, a storage 46, and a communication unit 56, for example. These components are connected through a bus not shown in the attached drawing. For example, the processor 42 is composed of CPU (Central Processing Unit), which performs various processes by reading and executing various programs stored in the memory 44.

The memory 44 stores programs executed by the processor 42, which is composed of ROM (Read Only Memory) and RAM (Random Access Memory). For example, the memory 44 stores various units shown in FIG. 4. For example, the storage 46 stores advertisement location setting data 48, voice advertisement data 50, set advertisement location information 52, user location information 54 acquired from the user terminal 20, and control programs not shown in the attached drawings. The communication unit 56 performs various data communications with the user terminal 20 and the advertiser terminal 80, 80A, 80B through a network. Obviously, the communication unit 56 performs various data communications with other external units if necessary.

For example, the advertisement location setting data 48 stored in the storage 46 is a map displayed on the display panel of the advertiser terminal 80 to designate an advertisement location. Moreover, the advertisement location setting data 48 may include data for displaying a category in place of a map for designating an advertisement location. For example, the category may be "scenic location" for delivering voice advertisement for a camera when the user terminal passes a scenic location or "futsal court" for delivering voice advertisement for sports products when the user passes a futsal court.

Figure 5:
FIG. 5 shows an example voice advertisement data of the embodiment.

FIG. 5 shows an example voice advertisement data 50A that composes the voice advertisement data 50 stored in the storage 46. As shown in FIG. 5, the voice advertisement data 50A contains the items of advertisement data, advertiser, advertisement location (or category), and delivery condition. For voice advertisement of the advertisement data 0001, the advertiser is "Company A", the advertisement location is "Sensou-ji Temple (2-3-1, Taito Ward, Asakusa)", and the delivery condition is "Within a radius of 100 m". For voice advertisement of the advertisement data 0002, the advertiser is "Company B", the advertisement location is "Athletic field", and the delivery condition is "On passing through the roads nearby".

Regarding the voice advertisement data 50A, the voice advertisement delivery server 40 receives designation of the advertisement location of voice advertisement when an advertiser 70 designates a specific preferred location on a map or a category displayed on the advertiser terminal 80 for input. Moreover, the voice advertisement delivery server 40 receives input of voice advertisement data together with designation of an advertisement location. In addition, the voice advertisement delivery server 40 may receive designation of a delivery condition at the same time and bind and store the received data as voice advertisement data 50A.

Functional Configuration of Voice Advertisement Delivery Server

Figure 4:
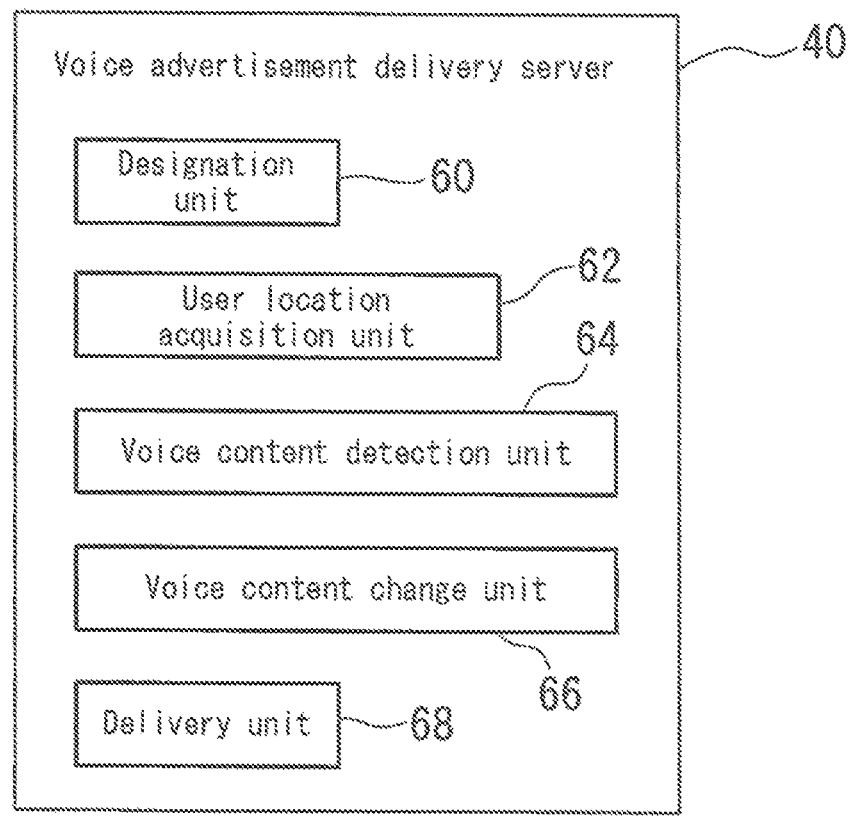
FIG. 4 is a block diagram that illustrates the functional configuration of the voice advertisement delivery server of the embodiment.

FIG. 4 is a block diagram that illustrates the functional configuration of the voice advertisement delivery server of the embodiment. The voice advertisement delivery server 40 is provided with a designation unit 60, a user location acquisition unit 62, a voice content detection unit 64, a voice content change unit 66, and a delivery unit 68.

The designation unit 60 designates advertisement location information indicating a location to set the voice advertisement. Specifically, the designation unit 60 receives designation of the advertisement location of voice advertisement when an advertiser 70 designates a specific preferred location on a map or a category displayed on the advertiser terminal 80 of an advertiser 70 to designate an advertisement location. The designation unit 60 sets the input voice advertisement to the designated advertisement location or category.

The user location acquisition unit 62 acquires the user location indicating the location of a user 10. The location of a user 10 may be location information acquired from the GPS 32 of the user terminal 20 through a network or from the GPS and the beacon of other terminals. The acquired user location information 54 may be stored in the storage 46.

The voice content detection unit 64 detects the voice content (e.g., music, radio) that the user is listening to with the user terminal 10.

The voice content change unit 66 changes the voice content detected by the voice content detection unit 64. The voice content change unit 66 changes the detected voice content to draw attention from the user 10.

The delivery unit 68 delivers the advertisement location information 52 and voice advertisement data 50 to the user terminal 20 when the user location information 54 acquired by the acquisition unit 62 approaches the designated advertisement location in a situation that satisfies a predetermined condition.

When the acquired user location approaches the designated advertisement location in a situation that satisfies a predetermined condition, the delivery unit 68 may change the attention level of the voice advertisement according to the change of the predetermined condition and deliver the voice advertisement to the user terminal 20. For example, the delivery unit 68 may change the volume and the tempo of the voice advertisement or switch between the voice advertisements for a radius of 100 to 50 m and for a radius of 50 to 0 m.

When the acquired user location moves away from the advertisement location after the user location approaches the designated advertisement location in a situation that satisfies a predetermined condition, the delivery unit 68 may stop the delivery of voice advertisement even in a situation that satisfies a predetermined condition. Thus, the voice advertisement in which user 10 is not interested cannot be delivered more than is necessary.

Moreover, when the acquired user location satisfies a predetermined condition of two or more advertisement locations, the delivery unit 68 may detect the direction which the user 10 approaches, select an advertisement location in the direction which the user 10 approaches from the two or more advertisement locations, and deliver the voice advertisement designated for the selected advertisement location. The user 10 may approach an advertisement location because she/he may be interested in the voice advertisement designated for the advertisement location. Thus, profitable (or interesting) voice advertisement can be delivered to the user 10.

When the direction of the face of the user 10 matches the direction of the advertisement location seen from the user 10, the delivery unit 68 may deliver the voice advertisement.

When the voice content detection unit 64 detects the voice content (e.g., music, radio) that the user 10 is listening to with the user terminal 20, the delivery unit 68 may deliver the voice advertisement according to the detected voice content.

For example, the delivery unit 68 may deliver the voice advertisement between the detected voice contents. Moreover, the delivery unit 68 may deliver the voice advertisement naturally over the detected voice contents. Alternatively, the delivery unit 68 may detect an interlude between the detected voice contents and deliver the voice advertisement over the voice contents. Moreover, when the detected voice content is music, the delivery unit 68 may change a part of the lyrics of the music into advertisement and deliver the voice advertisement. In addition, the delivery unit 68 may preferentially deliver the voice advertisement with high relativity to the detected voice content among two or more voice advertisements designated for close advertisement locations.

In the embodiment, the voice advertisement delivery server 40 is provided with the above-mentioned various units. However, the user terminal 20 may be provided with some or all of units except the designation unit 60.

Configuration of Advertiser Terminal

The advertiser terminal 80 of an advertiser 70 may be, for example, a smart phone like the advertiser terminal 80Aa or a note PC like the advertiser terminal 80B, as shown in FIG. 1. The advertiser terminal 80 may have any configuration as long as the advertiser terminal 80 is provided with a designation unit that designates an advertisement location and a communication unit that transmits the designated content to the voice advertisement delivery server 40 through a network.

Voice Advertisement Delivery Process

Figure 6:
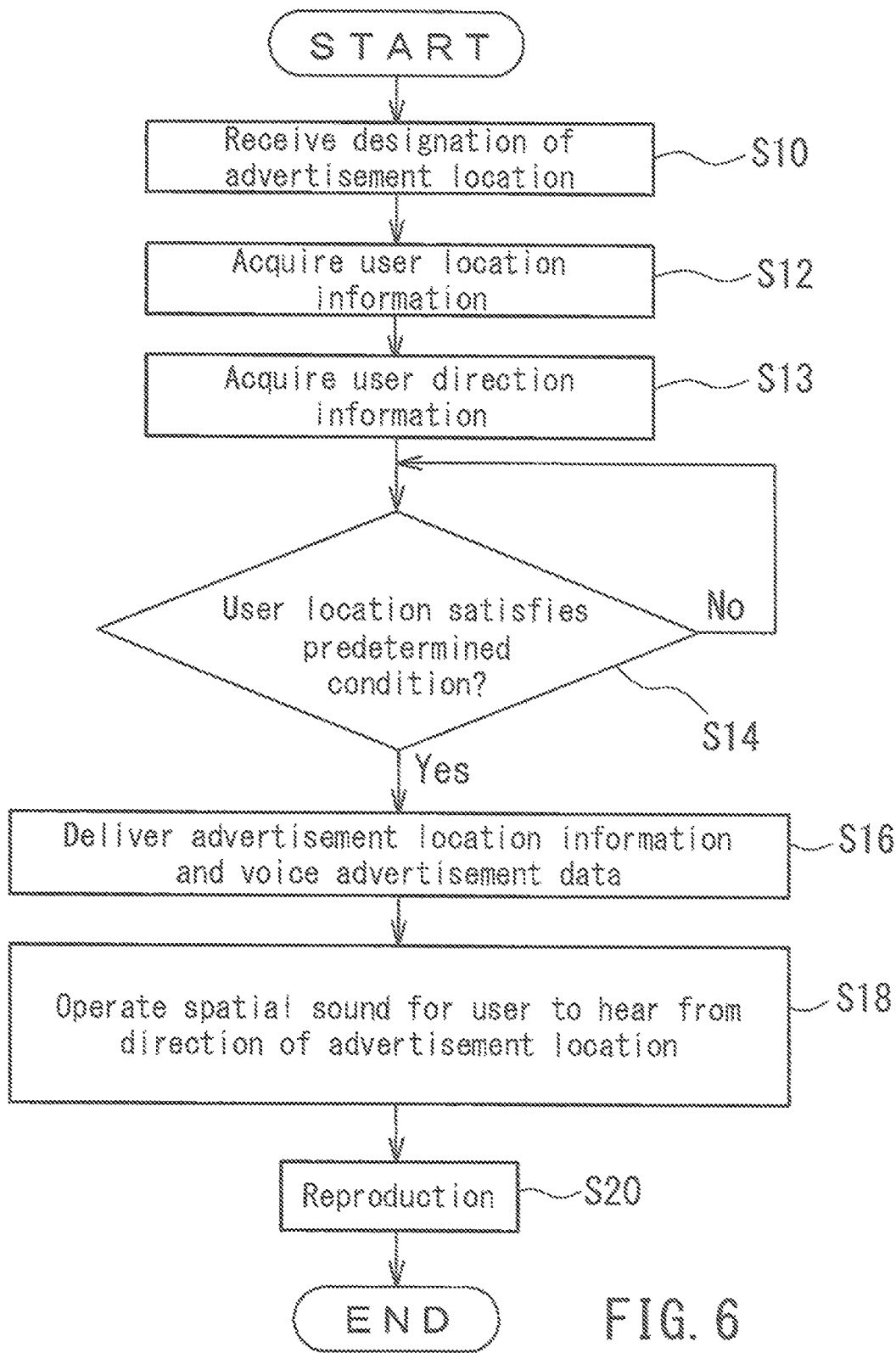
FIG. 6 is a flow chart that illustrates an example voice advertisement delivery process of the embodiment.
Figure 7:
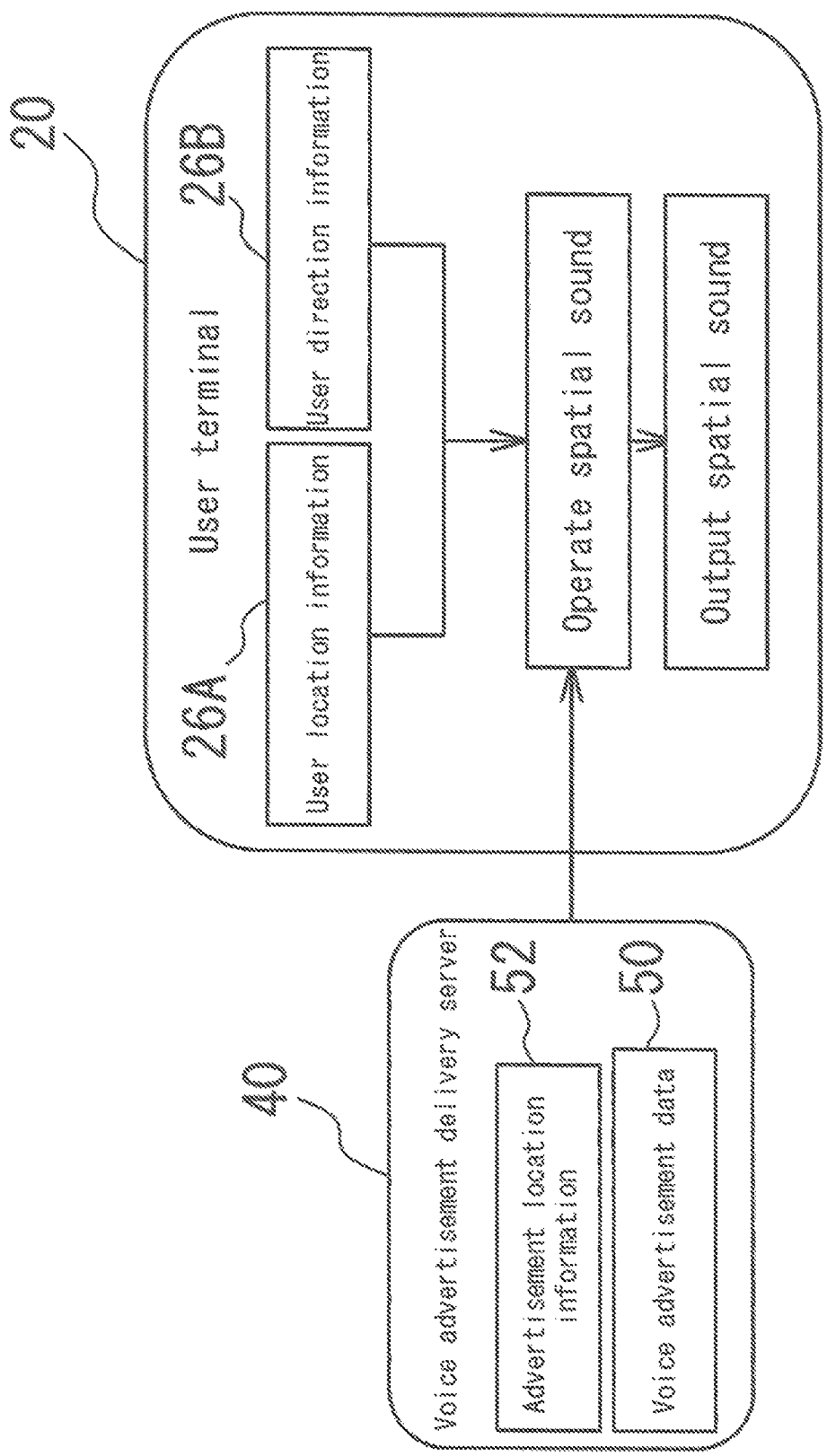
FIG. 7 shows an example spatial sound reproduction process of the embodiment.
Figure 8:
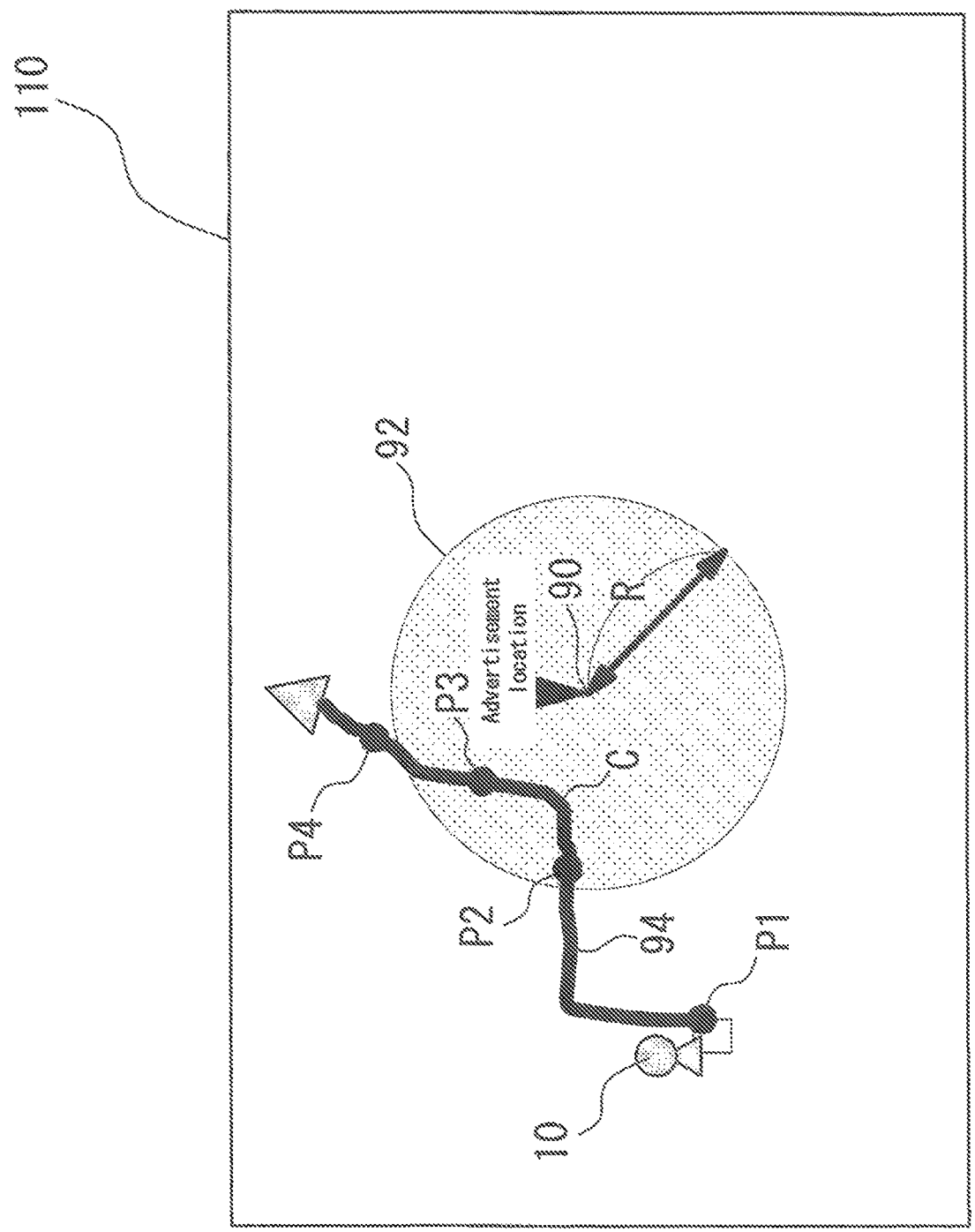
FIG. 8 shows the relationship between the advertisement location and the user location of the embodiment.

One example voice advertisement delivery process performed by the system for voice advertisement delivery 100 is described below with reference to FIGS. 6 to 8. FIG. 6 is a flow chart that illustrates an example voice advertisement delivery process of the embodiment. FIG. 7 shows an example spatial sound reproduction process of the embodiment. FIG. 8 shows the relationship between the advertisement location and the user location of the embodiment.

The voice advertisement delivery server 40 receives designation of a preferred location to which voice advertisement is delivered from the advertiser terminal 80 of an advertiser 70 (Step S10). Specifically, the designation unit 60 receives designation of the advertisement location of voice advertisement when an advertiser 70 designates a specific preferred location on a map or a category displayed on the advertiser terminal 80 of an advertiser 70 to designate an advertisement location. The designation unit 60 sets the input voice advertisement to the designated advertisement location or category.

The voice advertisement delivery server 40 acquires user location information indicating the location of a user 10 (Step S12). Specifically, the user location acquisition unit 62 acquires the user location information 54 from the GPS, the beacon, etc., of the user terminal 20 or other terminals.

The user terminal 20 acquires user direction information indicating the direction of the user 10 (Step S13). Specifically, the direction information is acquired from the electronic compass, etc., of the user terminal 20 or other terminals. The user direction information preferably indicates the direction of the user's face. If the user terminal 20 is an earphone, etc., which means that the user direction approximately corresponds to the direction of the terminal, the direction of the terminal may be used as user direction data.

If the acquired user location information 54 approaches the designated advertisement location information 52 in a situation that satisfies a predetermined condition (Step S14: Yes), the delivery unit 68 of the voice advertisement delivery server 40 delivers the advertisement location information 52 and voice advertisement data 50 to the user terminal 20 (Step S16). For example, the predetermined condition is within a radius of 100 m around the designated advertisement location.

When the spatial sound operation unit 36 of the user terminal 20 receives the advertisement location information 52 and the voice advertisement data 50 from the voice advertisement delivery server 40 through a network as shown in FIG. 7, the spatial sound operation unit 36 calculates the relative direction of the user to an advertisement location based on the user location information 26A, the user direction information 26B, and the advertisement location information 52 and operates spatial sound for the user to hear from the direction of the advertisement location (Step S18 of FIG. 6), and the reproduction unit 30 reproduces the spatial sound of the voice advertisement (Step S20). Accordingly, the spatial sound of the voice advertisement is audibly reproduced from the user terminal 20 used by a user 10 to hear from the direction of the location where voice advertisement is set.

At this time, the spatial sound operation unit 36 may operate spatial sound for the user to hear from the direction of the advertisement location to the user terminal 20 and reproduce the voice advertisement whenever the acquired user location information changes. In the example of shown in FIG. 8, the voice advertisement is reproduced for the user 10 to hear when the user 10 is in the advertisement delivery area 92 of the radius R (e.g., 100 m) around the advertisement location 90. In the map 110 of FIG. 8, the route 94 where the user 10 walks is shown in a heavy line.

When the user 10 is at the position P1, the voice advertisement is not delivered to the user terminal 20 because a predetermined condition of delivery of the voice advertisement is not satisfied (the user 10 is not within a radius R or less). When the user 10 is at the position P2, the voice advertisement is delivered to the user terminal 20 because a predetermined condition of delivery of the voice advertisement is satisfied (the user 10 is within a radius R or less). At this time, the voice advertisement from the direction of the front is reproduced for the user 10 to hear because the user 10 faces the front toward the advertisement location 90.

When the user 10 goes around the corner C and arrives at the position P3, the voice advertisement is delivered to the user terminal 20 because a predetermined condition of delivery of the voice advertisement is satisfied (the user 10 is within a radius R or less). At this time, the voice advertisement from the direction of the right is reproduced for the user 10 to hear because the user 10 goes around the corner C in the left direction. When the user 10 is at the position P4 without a radius R around the advertisement location 90, the voice advertisement is not delivered because the predetermined condition is not satisfied.

In the embodiment, when the acquired user location approaches the designated advertisement location in a situation that satisfies a predetermined condition, the delivery unit 68 may change the attention level of the voice advertisement according to the change of the predetermined condition and deliver the voice advertisement to the user terminal 20. For example, the delivery unit 68 may change the volume and the tempo of the voice advertisement or switch between the voice advertisements for a radius of 100 to 50 m and for a radius of 50 to 0 m.

In the embodiment, when the user location moves away from the advertisement location after the acquired user location approaches the designated advertisement location in a situation that satisfies a predetermined condition, the delivery unit 68 may stop the delivery of voice advertisement even in a situation that satisfies a predetermined condition. Thus, the voice advertisement in which user 10 is not interested cannot be delivered more than is necessary.

In the embodiment, when the acquired user location satisfies a predetermined condition of two or more advertisement locations, the delivery unit 68 may detect the direction which the user 10 approaches, select an advertisement location in the direction which the user 10 approaches from the two or more advertisement locations, and deliver the voice advertisement designated for the selected advertisement location. The user may approach an advertisement location because she/he may be interested in the voice advertisement designated for the advertisement location. Thus, profitable (or interesting) voice advertisement can be delivered to the user 10.

In the embodiment, when the direction of the face of the user 10 matches the direction of the advertisement location seen from the user 10, the delivery unit 68 may deliver the voice advertisement.

In the embodiment, when the voice content detection unit 64 detects the voice content (e.g., music, radio) that a user 10 is listening to with the user terminal 20, the delivery unit 68 may deliver the voice advertisement according to the detected voice content.

For example, the delivery unit 68 may deliver the voice advertisement between the detected voice contents. Moreover, the delivery unit 68 may deliver the voice advertisement naturally over the detected voice contents. Alternatively, the delivery unit 68 may detect an interlude between the detected voice contents and deliver the voice advertisement over the voice contents. Moreover, when the detected voice content is music, the delivery unit 68 may change a part of the lyrics of the music into advertisement and deliver the voice advertisement. In addition, the delivery unit 68 may preferentially deliver the voice advertisement with high relativity to the detected voice content among two or more voice advertisements designated for close advertisement locations.

In the embodiment, when the voice content change unit 66 may change the voice content detected by the voice content detection unit 64 to draw attention from the user 10. In addition, the spatial sound operation unit 36 may change the direction of the spatial sound of the detected voice content and inform the user the direction of preferred voice advertisement. Such change of the voice content may be carried out independently or together with the above-mentioned delivery of the spatial sound of the voice advertisement.

The operation of spatial sound is not limited to the case in which spatial sound is operated on the terminal side. The server side may receive the user location information and the user direction information and operate spatial sound based on the advertisement location information, the user location information, the user direction or the terminal information, and the terminal side may receive and reproduce the spatial sound data operated on the server side.

The voice advertisement data 50 should not necessarily be transmitted from the server side to the user terminal when the spatial sound is output. The voice advertisement data previously stored in the user terminal 20 can be input to a spatial sound output operation.

Effect

According to the above-mentioned embodiment, the system for voice advertisement delivery 100 designates advertisement location information indicating a location to set the voice advertisement; acquires user location information indicating the location of a user 10; acquires the user direction information indicating the direction of the user's face; delivers the advertisement location information and voice advertisement data to the user terminal 20 when the acquired user location information approaches the designated advertisement location information in a situation that satisfies a predetermined condition; and operates the relative direction of the user to an advertisement location based on the user location information, the user direction information, and the advertisement location information and operates spatial sound for the user to hear from the direction of the advertisement location. Accordingly, the spatial sound of the voice advertisement is audibly reproduced from the user terminal 20 used by a user 10 to hear from the direction of the location where voice advertisement is set.

The above-mentioned embodiment is one example. The present disclosure can be appropriately modified within the range producing a similar effect. The voice advertisement delivery server 40 may be a lone computer, for example, a terminal. The above-mentioned functional components may be executed by the respective computers in a computer system (cloud). Most of the processes are performed by the voice advertisement delivery server 40 in this embodiment. However, some or all functions except the function that receives designation of the advertisement location may be performed by the user terminal 20.

The computer (including CPU, an information processor, and various terminals) reads and executes a predetermined program to achieve the above-mentioned means and functions. For example, the program may be provided by one or more computer (SaaS: Software as a Service) or a cloud service through a network. The program is provided in a form recorded in a computer-readable recording medium, for example. In this case, the computer reads a program from the recording medium, and forwards it to an internal or an external storage, records it in the storage, and executes it.

The present disclosure may be provided as a method or program disclosure. The program may be previously recorded in a storage (recording medium) such as a magnetic, optical, or magnetic optical disk and provided from the storage to the computer through a communication line. The present disclosure may also be provided as the disclosure of a user terminal.

INDUSTRIAL APPLICABILITY

The present disclosure specifies advertisement location information indicating a location to set the voice advertisement; acquires user location information indicating the location of a user 10; acquires the user direction information indicating the direction of the user's face; delivers the advertisement location information and voice advertisement data to the user terminal 20 when the acquired user location information approaches the designated advertisement location information in a situation that satisfies a predetermined condition; and operates the relative direction of the user to an advertisement location based on the user location information, the user direction information, and the advertisement location information and operates spatial sound for the user to hear from the direction of the advertisement location. Accordingly, since the user terminal used by a user is able to audibly reproduce the spatial sound of the voice advertisement to a user terminal used by a user from the direction of the location where voice advertisement is set, the present disclosure can be applied for the use of the system for voice advertisement delivery.

DESCRIPTION OF REFERENCE NUMERALS

10: User, 20: User terminal, 22: Processor, 24: Memory, 26: Storage, 26A: User location information, 26B: User direction information, 28: Communication unit, 30: Reproduction unit, 32: GPS, 34: User direction acquisition unit, 36: Spatial sound operation unit, 40: Voice advertisement delivery server, 42: Processor, 44: Memory, 46: Storage, 48: Advertisement location setting data, 50, 50A: Voice advertisement data, 52: Advertisement location information, 54: User location information, 56: Communication unit, 60: Designation unit, 62: User location acquisition unit, 64: Voice content detection unit, 66: Voice content change unit, 68: Delivery unit, 70: Advertiser, 80, 80A, 80B: Advertiser terminal, 82: Touch panel, 84: Keyboard, 86: Display, 90: Advertisement location, 92: Advertisement delivery area, 94: Route, 100: System for voice advertisement delivery, 110: Map, C: Corner, P1-P4: Position

What is claimed is:

1. A system for voice advertisement delivery that audibly delivers spatial sound of voice advertisement to a user terminal used by a user from a direction of a location where voice advertisement is set, comprising:

a designation unit that designates advertisement location information indicating a location to set the voice advertisement;

a user location acquisition unit that acquires user location information indicating a location of a user;

a user direction acquisition unit that acquires the user direction information indicating a direction of the user's face;

a delivery unit that delivers the advertisement location information and voice advertisement data to the user terminal when the acquired user location information approaches the designated advertisement location information in a situation that satisfies a predetermined condition;

a spatial sound operation unit that operates a relative direction of the user to an advertisement location based on the user location information, the user direction information, and the advertisement location information and operates spatial sound for the user to hear from a direction of the advertisement location; and a voice content detection unit that detects a voice content that the user is listening to with the user terminal, wherein the delivery unit delivers the voice advertisement data according to the detected voice content, and when the detected voice content is music, the delivery unit changes a part of the lyrics of the music into advertisement and deliver the voice advertisement;

wherein when the acquired user location information satisfies a predetermined condition of the information of two or more advertisement locations, the delivery unit detects a direction which the user approaches, selects the information of an advertisement location in the direction which the user approaches from the two or more advertisement locations, and delivers the advertisement location information and the voice advertisement data that are designated for the selected advertisement location.

2. The system for voice advertisement delivery according to claim 1, wherein the spatial sound operation unit operates spatial sound for the user to hear from the direction of the advertisement location to the user terminal whenever the acquired user location information changes.

3. The system for voice advertisement delivery according to claim 1, wherein when the acquired user location information approaches the designated advertisement location information in a situation that satisfies a predetermined condition, the delivery unit changes the attention level of the voice advertisement according to the change of the predetermined condition and delivers the advertisement location information and the voice advertisement data to the user terminal.

4. The system for voice advertisement delivery according to claim 1, wherein when the user location information moves away from the advertisement location information after the acquired user location information approaches the designated advertisement location information in a situation that satisfies a predetermined condition, the delivery unit stops the delivery of the advertisement location information and the voice advertisement data even in a situation that satisfies a predetermined condition.

5. The system for voice advertisement delivery according to claim 1, wherein when the direction of the face of the user matches the direction of the advertisement location seen from the user, the delivery unit delivers the advertisement location information and the voice advertisement data.

6. The system for voice advertisement delivery according to claim 1, wherein the designation unit designates the voice advertisement location to a category.

7. The system for voice advertisement delivery according to claim 1, wherein the delivery unit delivers the voice advertisement data between the detected voice content and another detected voice content.

8. The system for voice advertisement delivery according to claim 1, wherein the delivery unit delivers voice advertisement naturally over the detected voice content.

9. The system for voice advertisement delivery according to claim 1, wherein the delivery unit detects interlude between the detected voice contents and deliver the voice advertisement data over the voice contents.

10. The system for voice advertisement delivery according to claim 1, wherein the delivery unit delivers voice advertisement data with high relativity to the detected voice content among two or more voice advertisements designated for close advertisement locations.

11. A system for voice advertisement delivery that audibly delivers spatial sound of voice advertisement to a user terminal used by a user from a direction of a location where voice advertisement is set, comprising:
- a designation unit that designates advertisement location information indicating a location to set the voice advertisement;
- a user location acquisition unit that acquires user location information indicating a location of a user;
- a user direction acquisition unit that acquires a user direction information indicating a direction of the user's face;
- a delivery unit that delivers the advertisement location information and voice advertisement data to the user terminal when the acquired user location information approaches the designated advertisement location information in a situation that satisfies a predetermined condition;
- a spatial sound operation unit that operates a relative direction of the user to an advertisement location based on the user location information, the user direction information, and the advertisement location information and operates spatial sound for the user to hear from a direction of the advertisement location;
- a voice content detection unit that detects a voice content that the user is listening to with the user terminal; and
- a voice content change unit that changes the detected voice content wherein
the delivery unit delivers the voice advertisement data according to the detected voice content, and
the spatial sound operation unit changes a direction of the spatial sound of the detected voice content and informs the user a direction of preferred voice advertisement;
wherein when the acquired user location information satisfies a predetermined condition of the information of two or more advertisement locations, the delivery unit detects a direction which the user approaches, selects the information of an advertisement location in the direction which the user approaches from two or more advertisements locations, and delivers the advertisement location information and the voice advertisement data that are designated for the selected advertisement location.

12. The system for voice advertisement delivery according to claim 11, wherein the spatial sound operation unit operates spatial sound for the user to hear from the direction of the advertisement location to the user terminal whenever the acquired user location information changes.

13. The system for voice advertisement delivery according to claim 11, wherein when the acquired user location information approaches the designated advertisement location information in a situation that satisfies a predetermined condition, the delivery unit changes the attention level of the voice advertisement according to the change of the predetermined condition and delivers the advertisement location information and the voice advertisement data to the user terminal.

14. The system for voice advertisement delivery according to claim 11, wherein when the user location information moves away from the advertisement location information after the acquired user location information approaches the designated advertisement location information in a situation that satisfies a predetermined condition, the delivery unit stops the delivery of the advertisement location information and the voice advertisement data even in a situation that satisfies a predetermined condition.

15. The system for voice advertisement delivery according to claim 11, wherein when the direction of the face of the user matches the direction of the advertisement location seen from the user, the delivery unit delivers the advertisement location information and the voice advertisement data.

16. The system for voice advertisement delivery according to claim 11, wherein the designation unit designates the voice advertisement location to a category.

17. The system for voice advertisement delivery according to claim 11, wherein the delivery unit delivers the voice advertisement data between the detected voice contents.

18. The system for voice advertisement delivery according to claim 11, wherein the delivery unit delivers voice advertisement naturally over the detected voice content.

19. The system for voice advertisement delivery according to claim 11, wherein the delivery unit detects interlude between the detected voice contents and deliver the voice advertisement data over the voice contents.

20. The system for voice advertisement delivery according to claim 11, wherein the delivery unit delivers voice advertisement data with high relativity to the detected voice content among two or more voice advertisements designated for close advertisement locations.

21. The system for voice advertisement delivery according to claim 11, wherein the voice content change unit changes the detected voice content to draw attention from the user.

* * * * *